United States Patent
Otani et al.

(10) Patent No.: US 8,400,413 B2
(45) Date of Patent: Mar. 19, 2013

(54) DISPLAY APPARATUS AND DISPLAY METHOD

(75) Inventors: Natsuki Otani, Kanagawa (JP); Takayuki Nakanishi, Kanagawa (JP); Daisuke Takama, Kanagawa (JP)

(73) Assignee: Sony Corporation, Tokyo (JP)

( * ) Notice: Subject to any disclaimer, the term of this patent is extended or adjusted under 35 U.S.C. 154(b) by 643 days.

(21) Appl. No.: 12/644,841

(22) Filed: Dec. 22, 2009

(65) Prior Publication Data

US 2010/0165004 A1    Jul. 1, 2010

(30) Foreign Application Priority Data

Dec. 25, 2008   (JP) ................. 2008-328962

(51) Int. Cl.
*G09G 3/36*   (2006.01)

(52) U.S. Cl. .......... 345/173; 345/174; 345/102

(58) Field of Classification Search .......... None
See application file for complete search history.

(56) References Cited

U.S. PATENT DOCUMENTS

| | | | |
|---|---|---|---|
| 2006/0103637 A1 | 5/2006 | Yamaguchi et al. | |
| 2006/0214892 A1 | 9/2006 | Harada et al. | |
| 2007/0013646 A1* | 1/2007 | Harada | 345/102 |

FOREIGN PATENT DOCUMENTS

| | | |
|---|---|---|
| JP | 2005-207830 | 8/2005 |
| JP | 2006-118965 | 5/2006 |
| JP | 2006-127212 | 5/2006 |
| JP | 2006-276223 | 10/2006 |
| JP | 2008-046817 | 2/2008 |
| JP | 2008-233257 | 10/2008 |
| JP | 2008-251020 | 10/2008 |
| WO | 2007-034602 | 3/2007 |

OTHER PUBLICATIONS

Japanese Office Action for corresponding JP 2008-328962 issued on Sep. 28, 2010.
Japanese Office Action issued Aug. 2, 2011, for corresponding Japanese Application No. 2008-328962.

* cited by examiner

*Primary Examiner* — Joseph Haley
(74) *Attorney, Agent, or Firm* — K&L Gates LLP

(57) ABSTRACT

Disclosed herein is a display apparatus including: a display panel having a plurality of picture elements configured to execute display by driving a liquid crystal layer; a backlight configured to illuminate a display surface of the display panel from a backside; a photodetector arranged on the plurality of picture elements and configured to receive a light entered from the side of the display surface of the display panel; and a detection block configured to execute image recognition in the proximity of the display surface from a difference between a photodetection amount in the photodetector in a state where an illuminating light from the backlight is radiated from the display surface and a photodetection amount in the photodetector in a state where the illuminating light is blocked before the display surface.

8 Claims, 17 Drawing Sheets

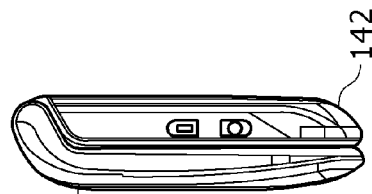
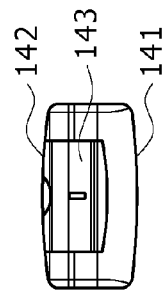
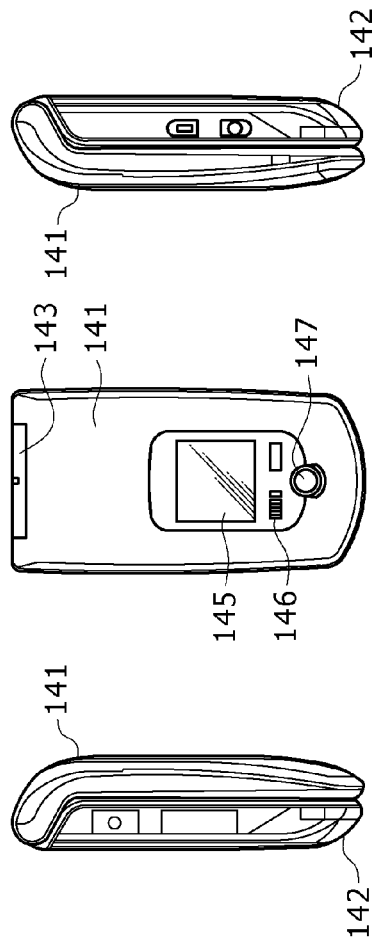
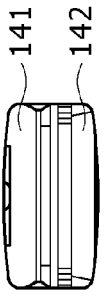
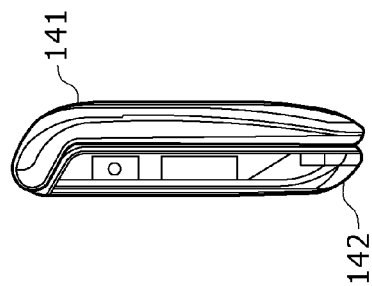
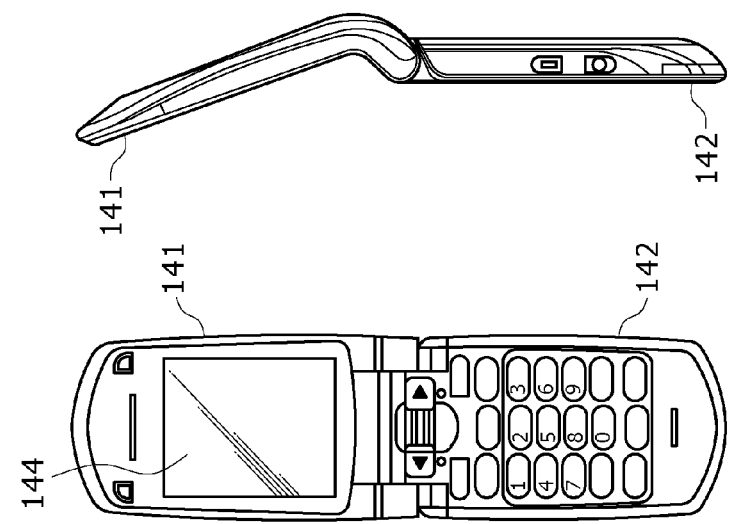

DISPLAY APPARATUS AND DISPLAY METHOD

CROSS REFERENCES TO RELATED APPLICATIONS

The present application claims priority to Japanese Priority Patent Application JP 2008-328962 filed in the Japan Patent Office on Dec. 25, 2008, the entire content of which is hereby incorporated by reference.

BACKGROUND

The present application relates to a display apparatus and, more particularly, to a display apparatus having an image input capability based on a photodetector and a display method.

For a display apparatus having an input capability for recognizing an object in the proximity of a display screen, an apparatus having a configuration in which a photodetector is arranged adjacent to display picture elements, for example. In a display apparatus thus configured, a noise due to a change in external environment or an internal configuration of the apparatus has an enormous effect on the recognition accuracy of an object. For example, with portable electronic devices, the noise level due to external light greatly differs between indoor and outdoor uses. Therefore, depending on use conditions, an object in the proximity of the screen may not be recognized.

Consequently, methods are proposed in which, with liquid crystal display apparatuses based on backlighting, intervals are provided in which the backlight is turned on and off within one frame period to execute signal reading two times, a difference between the read signals being converted into a binary value for the recognition of an object in the proximity of the display screen (for example, refer to Japanese Patent No. 4072732 (paragraphs 0070 through 0072 for example) and Japanese Patent Laid-open No. 2006-276223 (paragraphs 0024 through 0031 for example)).

SUMMARY

However, the above-mentioned schemes in which backlighting is turned on/off as described above cause a brightness reduction over all the display area. The improvement of this problem involves the increase in cost and power consumption. In addition, because the above-mentioned schemes involve flickering all over the display area, the picture quality is accordingly affected by the generation of flickers, for example.

Therefore, the present application addresses the above-identified and other problems associated with related-art methods and apparatuses and solves the addressed problems by providing a display apparatus and a display method that are configured to detect an object with precision without affecting the picture quality of overall display area even in the partial image detection in a predetermined area in the display area.

According to an embodiment mode thereof, there is provided a display apparatus. This display apparatus has a display panel having a plurality of picture elements configured to execute display by driving a liquid crystal layer and a backlight configured to illuminate a display surface of the display panel from the rear side of thereof. A photodetector is arranged on each of some of the plurality of picture elements and configured to receive a light entered from the side of the display surface of the display panel. Especially, a detection block is arranged that is configured to execute image recognition in the proximity of the display surface from a difference between a photodetection amount in the photodetector in a state where an illuminating light from the backlight is radiated from the display surface and a photodetection amount in the photodetector in a state where the illuminating light is blocked before the display surface.

According to another embodiment, there is provided a display method. First, this display method illuminates a display surface of a display panel having a plurality of picture elements for executing display by driving a liquid crystal layer and a photodetector arranged on the plurality of picture elements, from the side of a rear surface of the display panel by a backlight. Next, this display method executes image recognition in the proximity of the display surface from a difference between a photodetection amount received by the photodetector in a state where an illuminating light from the backlight is radiated from the display surface and a photodetection amount received by the photodetector in a state where the illuminating light from the backlight is blocked before the display surface.

According to the above-mentioned display apparatus and display method, image recognition in the proximity of a display surface can be executed on the basis of a photodetection amount with noise components due to a change in external environment and an internal configuration of the apparatus subtracted without making the backlight flash.

As described above and according to embodiments, image recognition in the proximity of a display surface can be executed on the basis of a photodetection amount with noise components due to a change in external environment and an internal configuration of the apparatus subtracted without making the backlight flash. Consequently, the novel configuration disclosed herein allows the precision detection of objects while preventing the brightness over all the display area from decreasing and flickers from occurring.

Additional features and advantages are described herein, and will be apparent from the following Detailed Description and the figures.

BRIEF DESCRIPTION OF THE FIGURES

FIGS. 19A to 19G show a portable terminal apparatus, a mobile phone for example, FIG. 19A indicative of a front view of an unfolded state, FIG. 19B indicative of a side view, FIG. 19C indicative of a front view of a folded state, FIG. 19D indicative of a left side view, FIG. 19E indicative of a right side view, FIG. 19F indicative of a top view, and FIG. 19G indicative of a bottom view.

DETAILED DESCRIPTION

The present application will be described in further detail with reference to the accompanying drawings according to an embodiment. The embodiments will be described in the following order:

(1) the first embodiment (an example of space division in which white display and black display are executed by liquid crystal driving for each picture element);

(2) the second embodiment (an example of a space division in which a part of a photodetector is provided with a light blocking film);

(3) the third embodiment (an example in which the first embodiment and the second embodiment are combined); and (4) the fourth embodiment (an example of time division in which white display and black display are executed with a single picture element).

(1) The First Embodiment

In the description of the first embodiment, an example is used in which image detection on the display surface is executed by space division in which white display and black display are executed by liquid crystal driving for each picture element.

Figure 1:
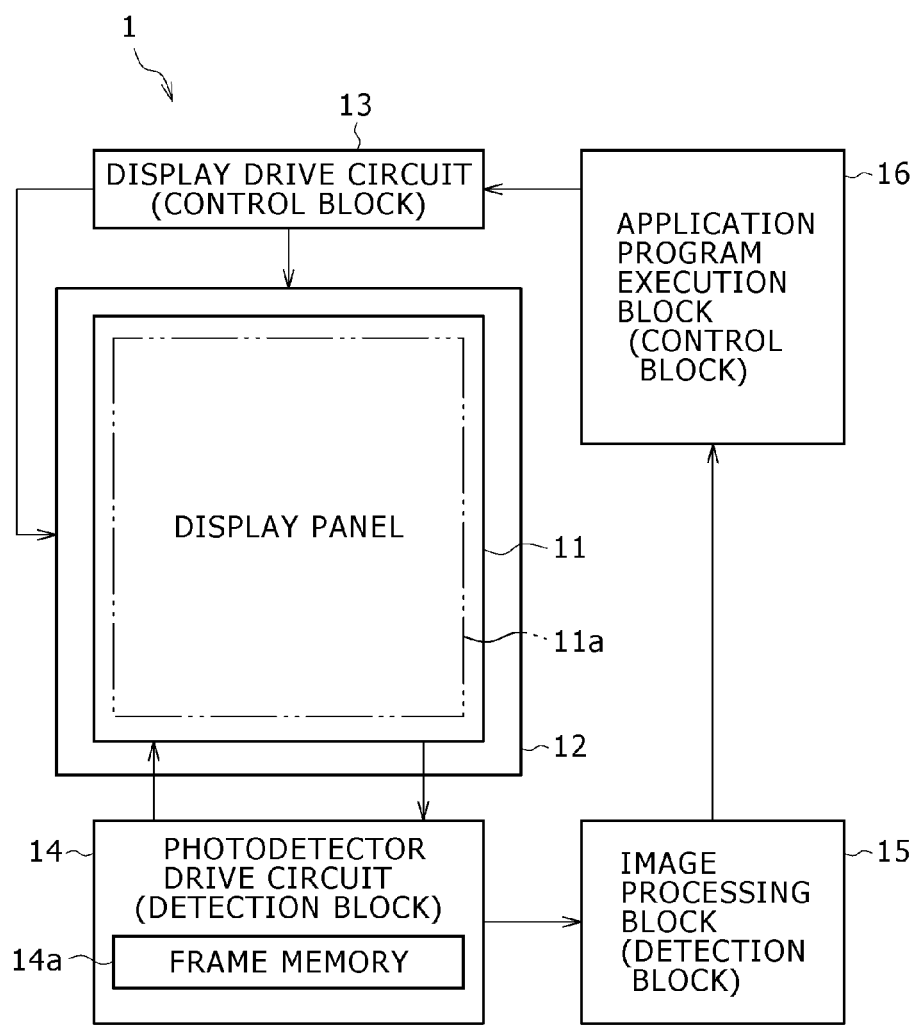
FIG. 1 is a block diagram illustrating an exemplary configuration of a display apparatus to which embodiments of the present application are applied.
Figure 2A:
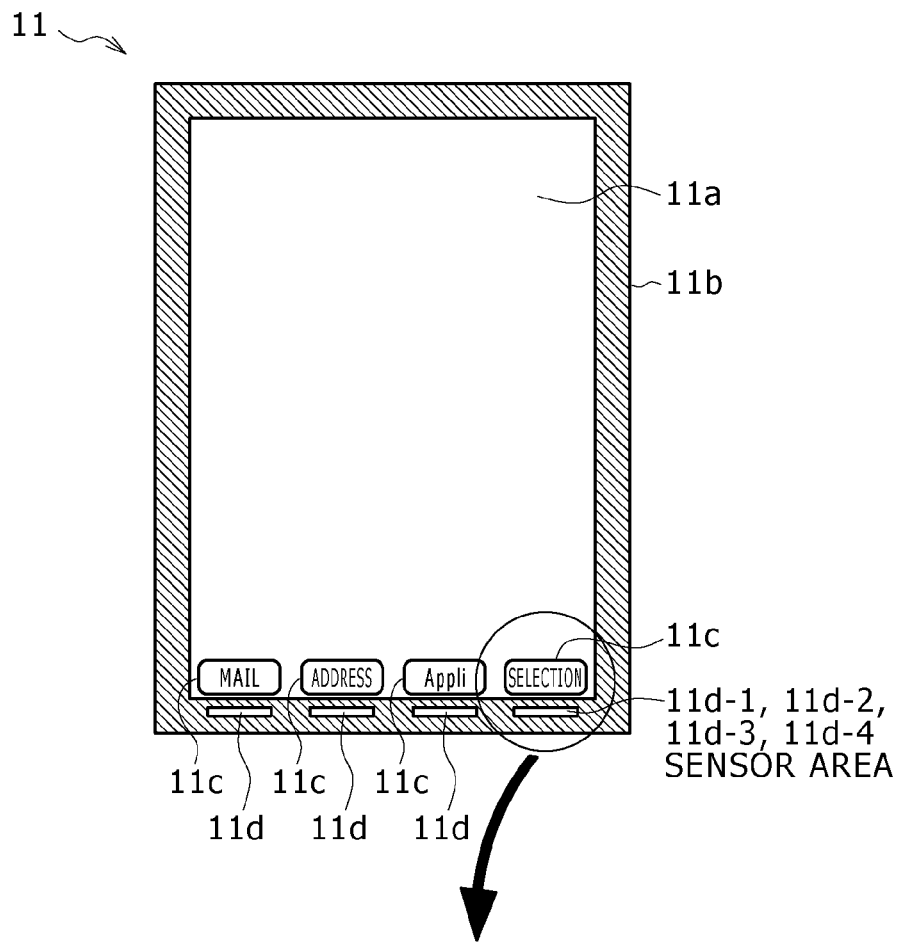
FIGS. 2A and 2B show a general top view of a display panel in the above-mentioned display apparatus and an expanded view of a main part of the display panel.
Figure 2B:
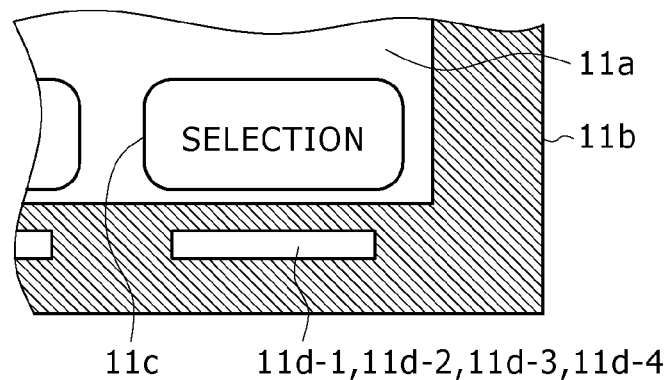

Overall Configuration of the Display Apparatus:

Now, referring to FIG. 1, there is shown a block diagram illustrating an exemplary configuration of a display apparatus to which the first embodiment is applied. FIG. 2A shows a general top view of a display panel and FIG. 2B shows an expanded view of the main part shown in FIG. 2A. A display apparatus 1 shown in these figures has a display panel 11, a backlight 12, a display drive circuit 13, a photodetector drive circuit 14, an image processing block 15, an application program execution block 16.

The display panel 11 is formed by an LCD (Liquid Crystal Display) panel made of a plurality of picture elements arranged all over a display area 11a at the center in a matrix manner and has a function of displaying of an image of predetermined graphics and texts on the basis of display data by executing a linear sequential operation. With this display panel 11, the external peripheral of the display area 11a that is an effective display area is covered with a light blocking film 11b. On a rim portion of the display area 11a, a plurality of operation display blocks 11c are arranged for switching between displays in the display area 11a, for example. Each of these operation display blocks 11c is configured such that an operation is displayed by being driven by a picture element circuit arranged in each picture element.

Especially, in the proximity of each of the operation display blocks 11c, a sensor area 11d-1 is arranged at an opening of the light blocking film 11b around the display area 11a, for example. This sensor area 11d-1 is provided to detect an object (a human finger for example) coming in contact with or in the proximity of the surface of the operation display blocks 11c. This sensor area 11d-1 has a picture element similar to the display area 11a for example or having a picture element circuit simplified so as to execute the switching of only black and white displays. In addition, each picture element contains a photodetector circuit having a photodetector. Details of the configuration of the sensor area 11d-1 will be described later.

The backlight 12 is a light source configured to supply illuminating light to the entire display area 11a in the display panel 11 and the sensor area 11d-1 and is made up of two or more light-emitting diodes, for example.

The display drive circuit 13 drives the picture element arranged on the display panel 11 so as to display an image based on display data in the display area 11a (including the operation display block 11c) of the display panel 11. In addition, this display drive circuit 13 also drives the picture element arranged in the sensor area 11d-1 of the display panel 11. It should be noted that details of the drive control of the display panel 11 in the display drive circuit 13 will be described later.

The photodetector drive circuit 14 drives this display panel 11 so as to get the photo detection data in the sensor area 11d-1 of the display panel 11. When the display panel 11 is driven, the photo detection data entered from the sensor area 11d-1 of the display panel 11 is outputted to the photodetector drive circuit 14 to be stored in a frame memory 14a on a frame basis, for example.

The image processing block 15 executes predetermined image processing (or operation processing) on the basis of the photo detection data stored in the photodetector drive circuit 14 to analyze information (or data associated with positional coordinates, object shape and size, and so on) associated with an object coming in contact with or in the proximity of the display panel 11, thereby detecting the object. Details of this image processing in the image processing block 15 will be described later.

The application program execution block 16 executes processing in accordance with predetermined application software on the basis of a detection result obtained in the image processing block 15. One example of this processing is that the positional coordinates of a detected object are included in the display data and switching is made between the displays of this display panel 11. It should be noted that the display data generated by the application program execution block 16 is supplied to the display drive circuit 13. Details of the drive control of the display panel 11 in the application program execution block 16 will be described later.

Figure 3A:
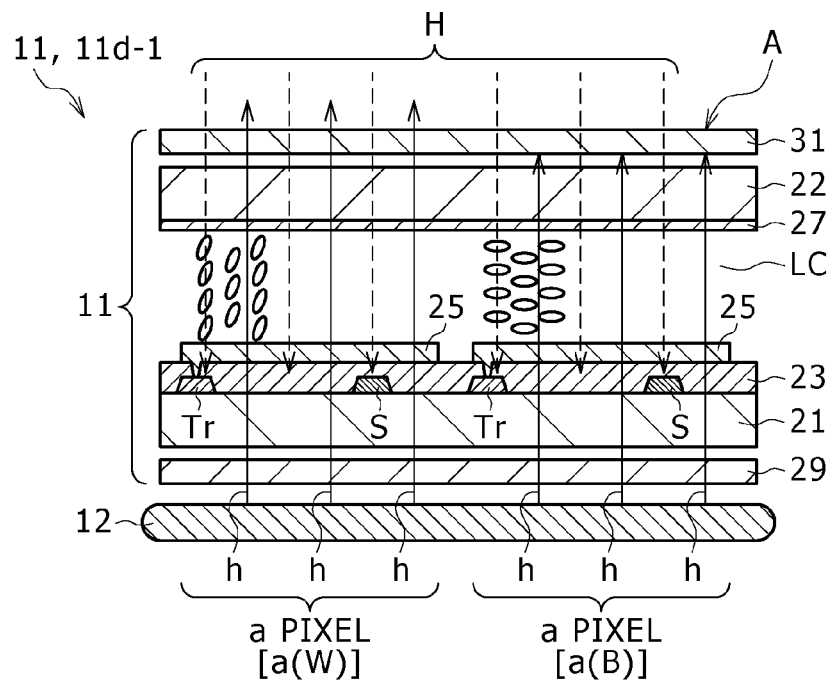
FIGS. 3A and 3B show cross sectional configuration diagrams of a sensor area of a first embodiment of the above-mentioned display apparatus.
Figure 3B:
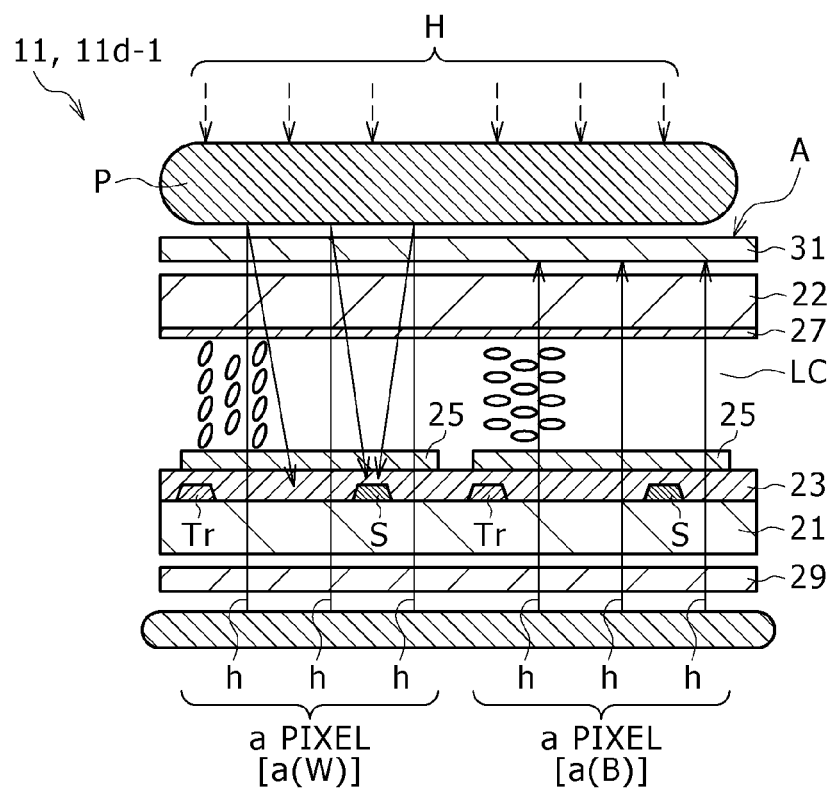

Cross Sectional Configuration of the Display Panel:

FIGS. 3A and 3B show cross sectional views of two picture elements typically indicative of a cross sectional configuration of the sensor area 11d-1 as a cross sectional configuration of the display panel 11 of the first embodiment. First, the cross sectional configuration of the display panel 11 will be described with referring to these figures.

As shown in these figures, the display panel 11 is made up of a first substrate 21 and a second substrate 22, made from a light transmissive material, with a liquid crystal (LC) layer sandwiched in between. Each picture element a on the liquid crystal layer LC of the first substrate 21 has a picture element circuit having a thin film transistor Tr for switching. Especially, each picture element a of the sensor area 11d-1 has a photodetector circuit having a photo detector S on the same layer as the picture element circuit having the thin film transistor Tr.

The thin film transistor Tr (the picture element circuit) and the photodetector S (the photodetector circuit) are covered with an insulation film 23. On each picture element a on the insulation film 23, a picture element electrode 25 connected to the thin film transistor Tr is arranged, the picture element electrode 25 being covered with an alignment film, not shown.

On the other hand, on the side of the liquid crystal layer LC of the second substrate 22, a common electrode 27 is arranged via a color filter and a black matrix, both not shown, the common electrode 27 being covered with an alignment film, not shown.

A polarizing plate that provides a polarizer 29 is arranged outside of the first substrate 21 and a polarizing plate that provides an analyzer 31 is arranged outside of the second substrate 22. Thus the display panel 11 is configured. In the display panel 11 thus configured, the side of the analyzer 31 provides display surface A and the backlight 12 is arranged as opposed to the polarizer 29.

With the display panel 11 thus configured, illuminating light h from the backlight 12 passes the polarizer 29 and then passes the liquid crystal layer LC oriented by the driving by the picture element electrode 25 in a predetermined state, thus getting in a polarized state, as shown in FIG. 3A. Only in picture element a (W) in which illuminating light h is polarized so as to pass through the analyzer 31, illuminating light h is radiated from the display panel 11 to execute white display (W). On the other hand, in the other picture element a (B), illuminating light h is absorbed by the analyzer 31 to execute black display (B).

Especially, in the sensor area 11d-1 in which the photodetector S is arranged, when object P gets in the proximity of the display surface side (or the side of the analyzer 31) of the display panel 11 as shown in FIG. 3B, illuminating light h that has passed the analyzer 31 in picture element a (W) is reflected from object P to be detected by the photodetector S.

It should be noted that the picture element configuration of the display area (11a) in the display panel 11 may be the same as the picture element configuration of the sensor area 11d-1 or may be a configuration having no photodetector S (or photodetector circuit) in the picture element configuration of the sensor area 11d-1. If a photodetector S (or a photodetector circuit) is arranged in the display area 11a, no photodetector S (or photodetector circuit) need be arranged in each picture element a; in such a case, a photodetector S (or a photodetector circuit) may be arranged only in a required position.

Figure 4:
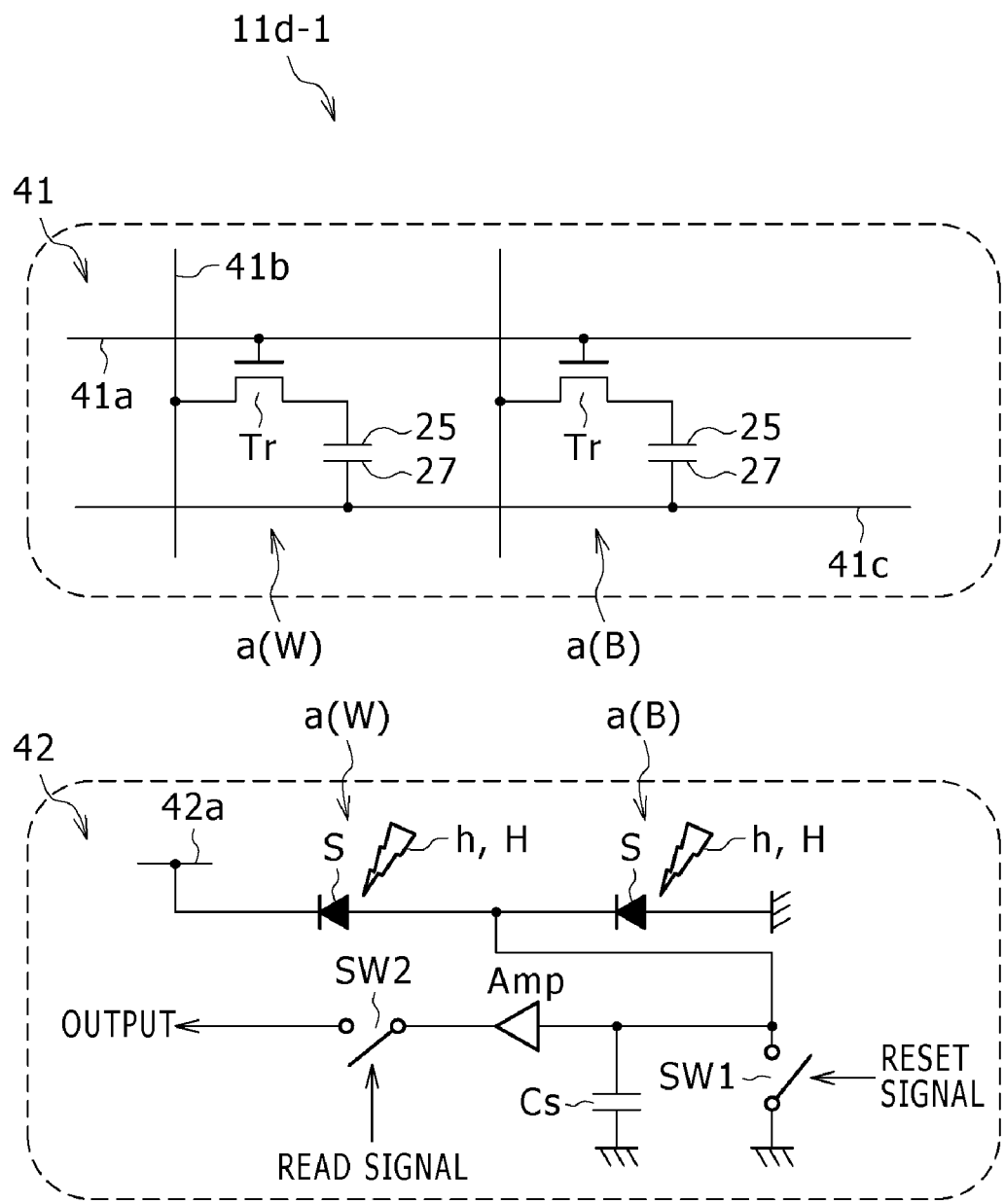
FIG. 4 shows circuit diagrams of a picture element circuit and a photodetector circuit that are arranged in each picture element of the sensor area of the first embodiment.

Circuit Configuration of the Display Panel:

Referring to FIG. 4, there is shown examples of a picture element circuit 41 arranged in each picture element a in the above-mentioned display panel (11) and a photodetector circuit 42 arranged in the sensor area 11d-1 of the display panel (11). It should be noted that, with reference to FIG. 4, components similar to those previously described with reference to FIGS. 3A and 3B are denoted by the same reference numerals.

The picture element circuit 41 arranged in each picture element a is configured such that the above-mentioned thin film transistor Tr is arranged at each cross section between a plurality of display select lines 41a extended horizontally and a plurality of display signal lines 41b extended vertically. Each thin film transistor Tr is arranged for switching between the picture element circuits of the picture elements a.

With the thin film transistor Tr, the gate thereof is connected to a scan line 41a, one of the source/drain is connected to a signal line 41b, and the other thereof is connected to a picture element electrode 25. A common electrode 27 arranged so as to hold a liquid crystal layer (LC) between the picture element electrode 25 and the common electrode 27 is connected to a common power supply 41c.

Consequently, on the basis of a drive signal supplied via the scan line 41a, the thin film transistor Tr is turned on/off. Then, a picture element voltage is applied to the picture element electrode 25 on the basis of a display signal supplied from the signal line 41b when the thin film transistor Tr is on, thereby driving the liquid crystal layer (LC) by an electric field generated between the picture element electrode 25 and the common electrode 27.

On the other hand, the photodetector circuit 42 arranged in the sensor area (11d) is provided in a state in which one circuit is shared by two adjacent picture elements a. With this photodetector circuit 42, two photodetectors S, S are connected in series to each power supply line 42a extended horizontally. These photodetectors S, S are arranged in the two adjacent picture elements a as shown in FIGS. 3A and 3B.

Between the two photodetectors S, S connected in series, a reset switch SW1 and a capacitor Cs are connected and, via an amplifier Amp, a read switch SW2 is connected. Consequently, the photodetector circuit 42 is configured that a difference in a voltage proportional to a charge reset by the reset switch SW1 and then photoelectrically converted by the two photodetectors S is outputted via the amplifier Amp as photodetection data when the read switch SW2 is turned on. The outputted photodetection data is outputted to and accumulated in the photodetector drive circuit (14) described above and is used for the detection of the information associated with the object in contact with or in the proximity of the display surface of the display panel (11) in the image processing block (15).

It should be noted that, if a photodetector circuit is arranged in the display area 11a of the display panel 11, the photodetector circuit may be substantially the same in configuration as the photodetector circuit 42 in the sensor area 11d-1 or may be a photodetector circuit having only one photodetector.

A Method of Driving a Display Panel:

The following describes a method of driving the display panel 11 having the above-mentioned configuration with reference to FIGS. 3A and 3B.

First, on the basis of the display data supplied from the display drive circuit (refer to FIG. 1), the backlight 12 is turned on.

Then, in the display area (11a) of the display panel 11, the picture element circuit of each picture element a is driven to align the liquid crystal layer LC into a predetermined state by turning on/off the picture element electrode 25, thereby executing a display operation based on the display data. In doing this, as described above, illuminating light h is radiated from the display panel 11 to execute white display (W) in picture element a (W) with illuminating light h from the backlight 12 polarized so as to pass through the analyzer 31. On the other hand, in the other picture element a (B), illuminating light h is absorbed by the analyzer 31 to execute black display (B).

In the sensor area 11d-1 of the display panel 11, one of the two picture elements a sharing the photodetector circuit 42, a (W) is normally white displayed (W), while the other picture element a (B) is normally black displayed (B). It should be noted that these two picture elements a (W) and a (B) are not limited to the picture elements that share the scan line 41a.

Consequently, as shown in FIG. 3A, with picture element a (W) of normally white display (W), illuminating light h from the backlight 12 is kept radiated from display surface A. With picture element a (B) of normally black display (B), illuminating light h from the backlight 12 is absorbed by the analyzer 31 for blocking Then, in a state where picture element a (W) with illuminating light h radiated and picture element a (B) with illuminating light h blocked are separately set, these picture elements are arranged in an adjacent state.

The above-mentioned liquid crystal layer drive control in the display panel 11 is executed by a control block based on the display drive circuit 13 and the application program execution block 16 shown in FIG. 1.

Figure 5:
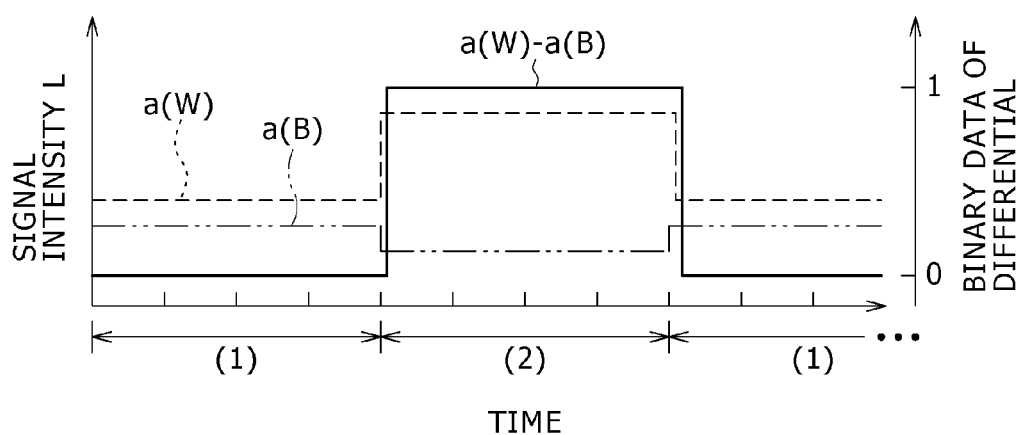
FIG. 5 is a graph indicative of signal intensity and binary data with a photodetector for describing a method of driving of the first embodiment.

Detection of an Object on the Display Panel:

The following describes the detection of object P on the display panel 11 having the above-mentioned configuration with reference to FIGS. 3A, 3B and 5. It should be noted that FIG. 5 shows a graph indicative of a relation between intensity L of a signal detected by each photodetector S in picture element a (W) and picture element a (B) in the sensor area 11d-1 and the binary data obtained from a difference between these picture elements.

First, as shown in FIGS. 3A and 5(1), the normal state in which an image is only displayed on display surface A of the display panel 11 is as follows.

To be specific, picture element a (W) of the sensor area 11d-1 is in a state where illuminating light h from the backlight 12 is radiated from display surface A. Hence, the photodetector S of picture element a (W) receives "external light H" entered from the side of display surface A into the display panel 11 and "scattered illuminating light h" in the display panel 11.

On the other hand, in picture element a (B) of the sensor area 11d-1, illuminating light h from the backlight 12 is absorbed by the analyzer 31 and in the blocked state. Hence, the photodetector S of picture element a (B) receives "external light H" entered in the display panel 11 and "scattered illuminating light h" in the display panel 11. However, in picture element a (B), illuminating light h is absorbed by the analyzer 31, so that the amount of received light in the photodetector S is reduced by the amount of this absorption.

Consequently, photoelectric conversion is executed by the two photodetectors S, S in picture elements a (W) and a (B) of the sensor area 11d-1 and the photodetection data of the difference synthesized in the photodetector circuit (42; refer to FIG. 4) provides a value obtained by removing the most noise components such as "external light H" and "scattered illuminated light h." Therefore, putting the photodetection data with the noise components thus removed into binary data relative to a properly set standard threshold value allows a precision determination that object P does not exist in the proximity of picture elements a (W) and a (B) in the sensor area 11d-1.

Next, as shown in FIGS. 3B and 5(2), in an operation state where object P, such as a human finger or a pen tip, gets in the proximity of the operation display block 11c on display surface A of the display panel 11, object P also gets in the proximity of the sensor area 11d-1 arranged in the proximity of the operation display blocks 11c, followed by a state shown below.

To be more specific, in picture element a (W) of the sensor area 11d-1, illuminating light from the backlight 12 is radiated from display surface A to be reflected from object P and external light H from the side of display surface A is blocked by object P. Hence, photodetector S of picture element a (W) receives "illuminating light h reflected from object P" and, in the display panel 11, "scattered illuminating light h."

On the other hand, with picture element a (B) of the sensor area 11d-1, illuminating light h from the backlight 12 is absorbed by the analyzer 31 to be blocked and external light H from the side of display surface A is also blocked by object P. Hence, photodetector S of picture element a (B) receives "scattered illuminating light h" in the display panel 11.

Consequently, the photodetection data of difference photoelectrically converted by the two photodetectors S is in picture elements a (W) and a (B) of the sensor area 11d-1 and synthesized by the photodetector circuit (42; refer to FIG. 4) is removed of most noise components to provide a value that is attributable mainly to "illuminating light h reflected from object P." Therefore, putting the photodetection data with the noise components thus removed into binary data relative to a properly set standard threshold value allows a precision determination that object P exists in the proximity of picture elements a (W) and a (B) in the sensor area 11d-1.

The processing of binarizing the photodetection data of difference (or voltage difference) synthesized by the photodetector circuit (42; refer to FIG. 4) relative to standard threshold value is executed by the image processing block (15; refer to FIG. 1). Therefore, the photodetector circuit 42, the photodetector drive circuit (14), and the image processing block (15) form a detection block for executing image recognition in the proximity of the display surface on the basis of the difference of the photodetection data in each of photodetectors S arranged in two different states.

As described above, the first embodiment allows image recognition in the proximity of the display surface by a photodetection amount obtained by subtracting the noise caused by a change in external environment or an internal configuration of the apparatus, without flashing the backlight 12. Consequently, the first embodiment allows the highly accurate detection of object P, while preventing the luminance reduction over all the display area 11a and the generation of flickers.

(2) The Second Embodiment

The second embodiment will be described by use of an example in which image detection is executed on the display surface by space division for executing white display and black display by arranging a light blocking film on a part of each photodetector.

Overall Configuration of a Display Apparatus:

An overall configuration a display apparatus to which the second embodiment is applied is substantially the same as that described with reference to the block diagram shown in FIG. 1 and the general top view shown in FIGS. 2A and 2B in the case of the first embodiment. However, a difference between the first and second embodiments lies in that, with the second embodiment, a light blocking film is arranged for a part of each photodetector in a sensor area 11d-1 of a display panel 11. The following describes in detail such different points from the first embodiment.

Figure 6A:
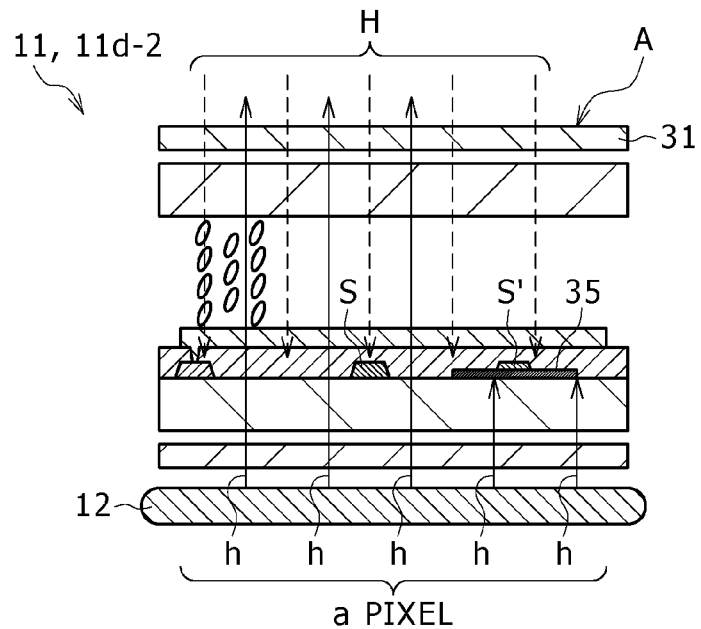
FIGS. 6A and 6B are cross sectional configuration diagrams of a sensor area of a second embodiment.
Figure 6B:
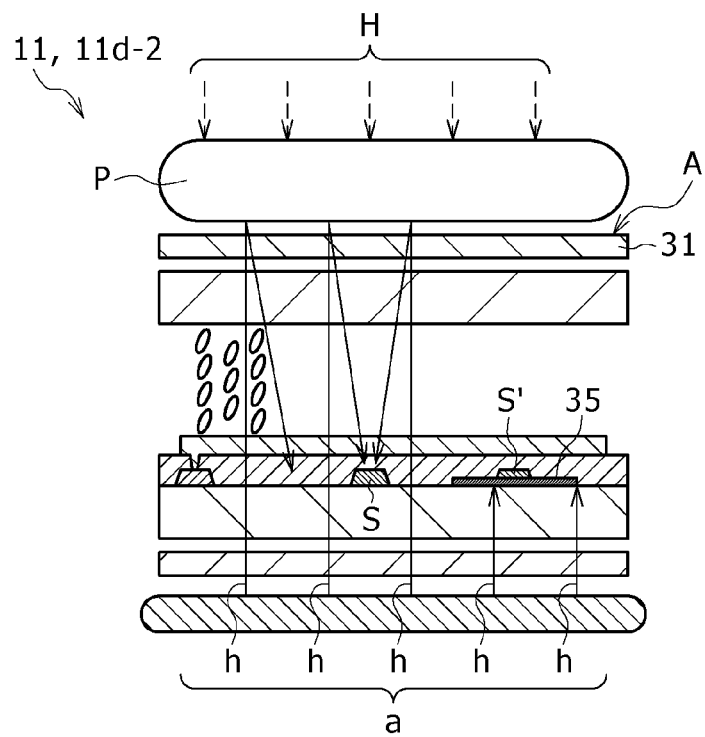

Cross Sectional Configuration of a Display Panel:

FIGS. 6A and 6B show cross sections for one picture element typically indicative of a cross sectional configuration of a sensor area 11d-2 as a cross sectional configuration of a display panel 11 of the second embodiment. The cross sectional configuration of the second embodiment shown in these figures is different from that of the display panel of the first embodiment in that two photodetectors S, S' are arranged in each picture element a in the sensor area 11d-2 and a light blocking film 35 is arranged on one of these photodetectors, S'. The other portions of the cross sectional configuration are substantially the same as those of the first embodiment, so that details thereof will be skipped.

It is assumed that the light blocking film 35 be arranged on the side of a backlight 12 rather than the photodetector S' in the display panel 11. Preferably, it is assumed that the light blocking film 35 be arranged between a first substrate 21 and the photodetector S' with a certain space such that the reflection of illuminating light h from the backlight 12 is hardly radiated by the photodetector S'. However, it is important for the light blocking film 35 to be arranged at a position where the light blocking film 35 does not block the illuminating light h from reflectingly entering the other photodetector S arranged in picture element a.

It should be noted that the picture element configuration of the display area 11a in the display panel 11 may be the same as the picture element configuration of the sensor area 11d-2 or may be one in which the photodetectors S, S' (a photodetector circuit) are not provided in the picture element configuration of the sensor area 11d-2.

Figure 7:
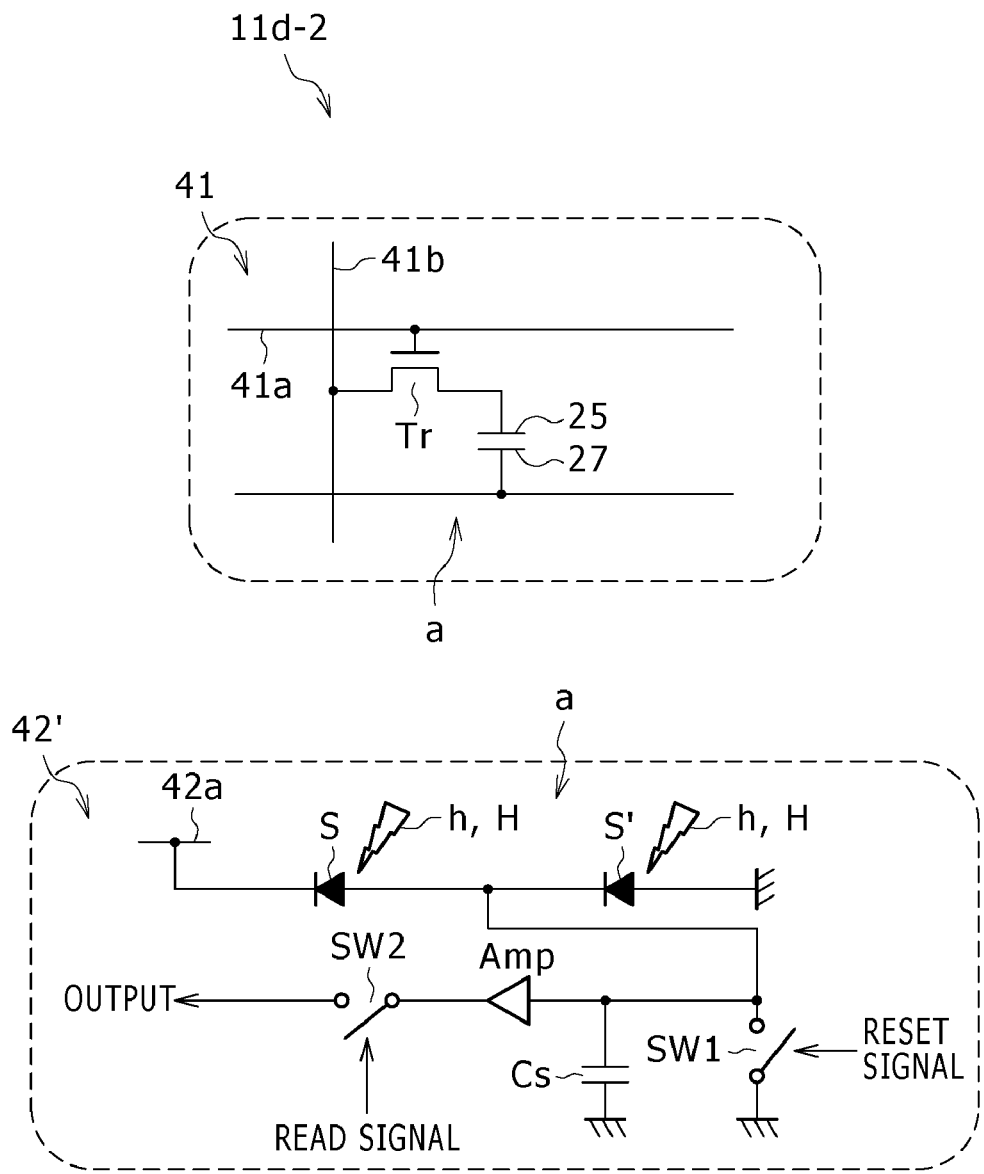
FIG. 7 shows circuit diagrams of a picture element circuit and a photodetector circuit that are arranged in each picture element of the sensor area of the second embodiment.

Circuit Configuration of the Display Panel:

FIG. 7 shows examples of a picture element circuit 41 arranged in each picture element a in the above-mentioned display panel (11) and a photodetector circuit 42' arranged in the sensor area 11d-2 of the display panel (11). It should be noted that, with reference to FIG. 7, components similar to those previously described with reference to FIGS. 6A and 6B are denoted by the same reference numerals.

The circuit of the sensor area 11d-2 in the display panel (11) in the second embodiment shown in FIG. 7 is different from the circuit of the first embodiment in that the photodetector circuit 42' is arranged in which the photodetector circuit 42' having two photodetectors S, S' are arranged for one picture element a. The other portions of the configurations are the same as those of the first embodiment. However, the photodetector S' of the two photodetectors S, S' forming the photodetector circuit 42' is covered with the light blocking film (35) shown in FIGS. 6A and 6B.

Method of Driving the Display Panel:

The following describes a method of driving the display panel 11 of the second embodiment with reference to FIGS. 6A and 6B. It should be noted that the driving of the picture elements arranged in the display area 11a is the same as that of the first embodiment, so that the description of the driving in the second embodiment will be skipped.

The method of driving the display panel 11 in the second embodiment shown in FIGS. 6A and 6B is different from that of the first embodiment in that all the picture elements a of the sensor area 11d-2 are normally white displayed (W).

As shown in FIG. 6A, illuminating light h from the backlight 12 is left radiated from display surface A in each picture element a of the sensor area 11d-2.

The above-mentioned drive control on the liquid crystal layer in the display panel 11 is executed through a control block made up of a display drive circuit 13 and an application program execution block 16.

Figure 8:
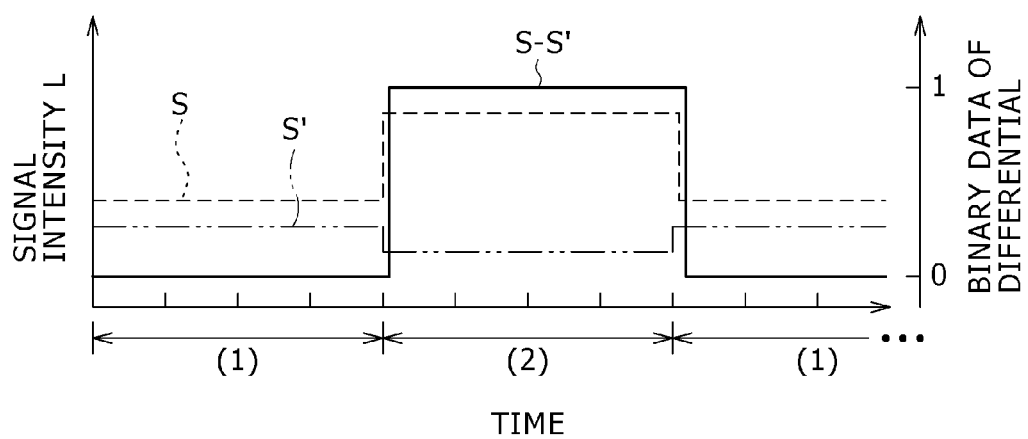
FIG. 8 is a graph indicative of signal intensity and binary data with a photodetector for describing a method of driving of the second embodiment.

Detection of an Object on the Display Panel:

The following describes the detection of object P on the above-mentioned display panel 11 of the second embodiment with reference to FIG. 8 together with FIGS. 6A and 6B. It should be noted that FIG. 8 is a graph indicative of a relation between intensity L of each signal received by photodetectors S and S' of each picture element a in the sensor area 11d-2 and binary data obtained from a difference between S and S'.

First, as shown in FIGS. 6A and 8(1), a normal state in which an image is only shown on display surface A of the display panel 11 is as follows.

To be specific, in picture element a in the sensor area 11d-2, illuminating light h from the backlight 12 is left radiated from display surface A. Hence, photodetector S of picture element a receives "external light H" entered from the side of display surface A into the display panel 11 and "scattered illuminating light h" inside the display panel 11.

With photodetector S' of picture element a, illuminating light h from the backlight 12 is kept blocked by the light blocking film 35. This photodetector S' likewise receives "external light H" entered into the display panel 11.

Consequently, the photodetection data of difference photoelectrically converted the two photodetectors S and S' arranged in one picture element a in the sensor area 11d-2 and synthesized by the photodetector circuit (42'; refer to FIG. 7) provides a value removed of "external light H" entered as a noise component. Therefore, putting the photodetection data with the noise components thus removed into binary data relative to a properly set standard threshold value allows a precision determination that object P does not exist in the proximity of picture elements a in the sensor area 11d-2.

Next, as shown in FIGS. 6B and 8(2), in an operation state where object P, such as a human finger or a pen tip, gets in the proximity of the operation display block 11c on display surface A of the display panel 11, object P also gets in the proximity of the sensor area 11d-2 arranged in the proximity of the operation display blocks 11c, followed by a state shown below.

To be specific, in picture element a of the sensor area 11d-2, illuminating light h from the backlight 12 is radiated from display surface A to be reflected from object P and external light H from the side of display surface A is blocked by object P. Hence, photodetector S of picture element a receives "illuminating light h reflected from object P" and, inside the display panel 11, "scattered illuminating light h."

On the other hand, with photodetector S' of picture element a, illuminating light h from the backlight 12 is blocked by the light blocking film 35 and external light H from the side of display surface A is also blocked by object P.

Consequently, the photodetection data of difference photoelectrically converted by the two photodetectors S, S' arranged in picture element a inside the sensor area 11d-2 and synthesized by the photodetector circuit (42'; refer to FIG. 7) is removed of a noise component due to "external light H" to provide a value caused by "illuminating light h reflected from object P." Therefore, putting the photodetection data with the noise components thus removed into binary data relative to a properly set standard threshold value allows a precision determination that object P exists in the proximity of picture element a in the sensor area 11d-2.

The processing of binarizing the photodetection data of difference (or voltage difference) synthesized by the photodetector circuit (42'; refer to FIG. 7) relative to standard threshold value is executed by the image processing block (15; refer to FIG. 1). Therefore, the photodetector circuit 42', the photodetector drive circuit (14), and the image processing block (15) form a detection block for executing image recognition in the proximity of the display surface on the basis of the difference of the photodetection data in each of photodetectors S arranged in two different states.

As described above, the configuration of the second embodiment also allows image recognition in the proximity of the display surface by a photodetection amount obtained by subtracting the noise caused by a change in external environment or an internal configuration of the apparatus, without flashing the backlight 12. Consequently, like the first embodiment, the second embodiment allows the highly accurate detection of object P, while preventing the luminance reduction over all the display area 11*a* and the generation of flickers.

(3) The Third Embodiment

The following described the third embodiment by use of an example in which the first embodiment and the second embodiment are combined to execute image detection on a display surface.

Overall Configuration of Display Apparatus:

An overall configuration of a display apparatus is substantially the same as the overall configuration of the first embodiment described before with reference to the block diagram of FIG. 1 and the general top view of FIGS. 2A and 2B. In addition, a configuration in which a light blocking film is provided for some photodetectors in a sensor area 11*d*-3 of a display panel 11 is substantially the same as the configuration of the second embodiment. The following describes details of characteristic elements of the third embodiment.

Figure 9A:
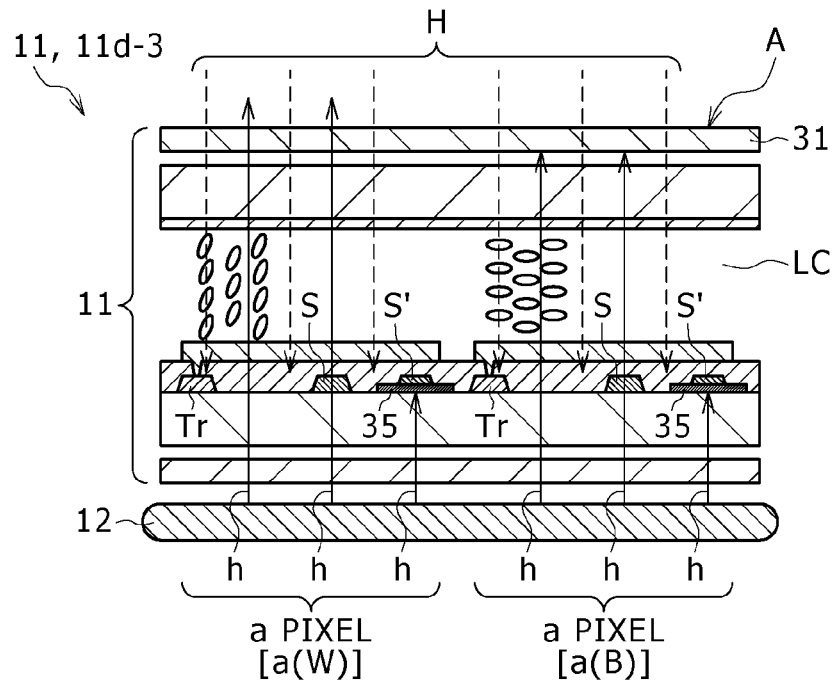
FIGS. 9A and 9B are cross sectional configuration diagrams of a sensor area of a third embodiment.
Figure 9B:
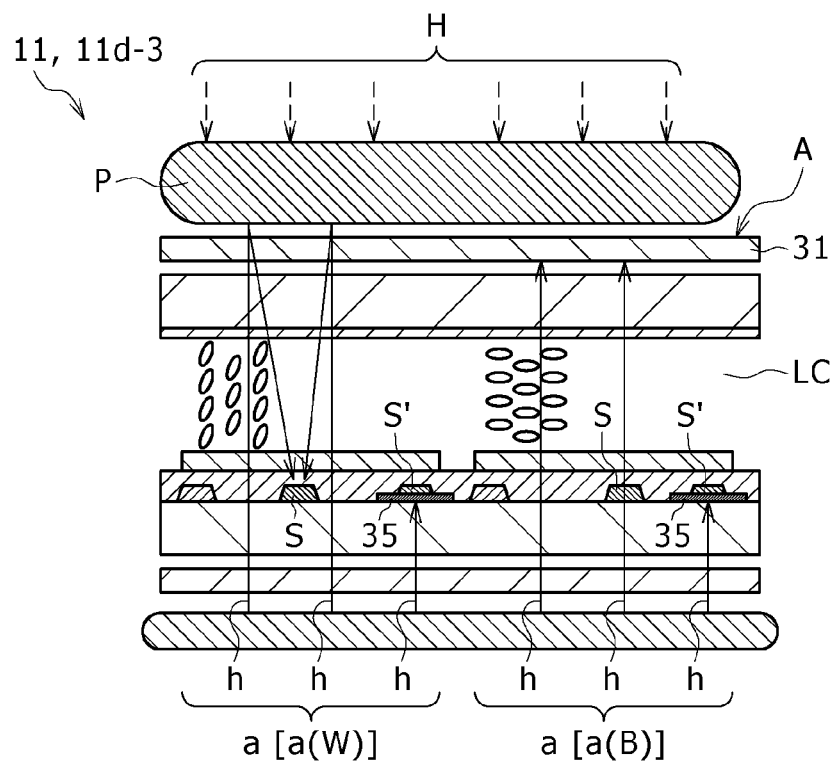

Cross Sectional Configuration of the Display Panel:

FIGS. 9A and 9B show cross sections for two picture elements typically indicative of a cross sectional configuration of the sensor area 11*d*-3 as a cross sectional configuration of the display panel 11 of the third embodiment. The cross sectional configuration of the display panel 11 of the third embodiment shown in these figures is substantially the same as that of the display panel of the second embodiment. A difference from the second embodiment lies in that two photodetectors S, S' are arranged inside each picture element a in the sensor area 11*d*-3 and a light blocking film 35 is provided on one of these photodetectors, S'. The other portions of the cross sectional configuration are substantially the same as those of the second embodiment, so that detail description thereof will be skipped.

Figure 10:
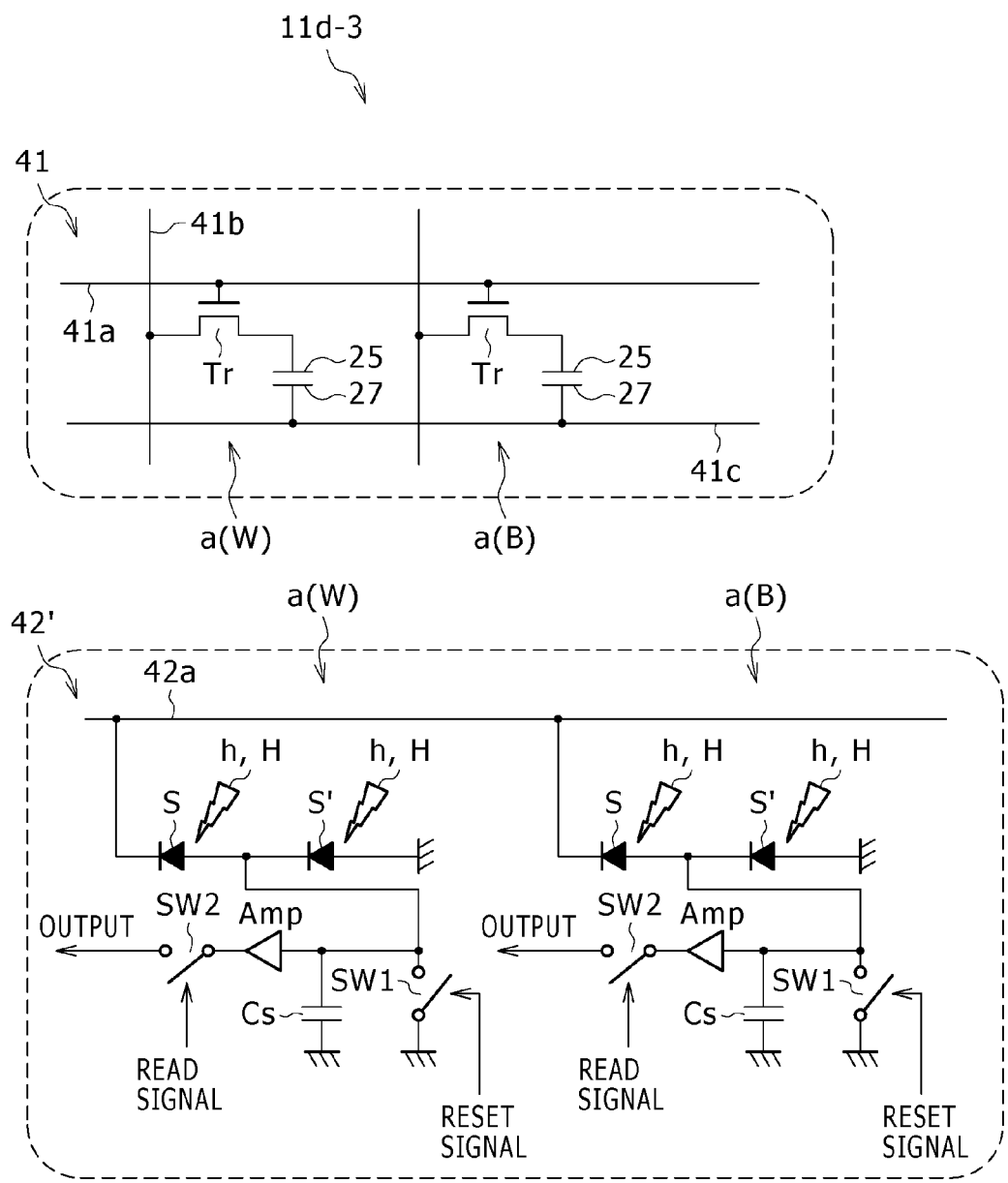
FIG. 10 shows a picture element circuit and a photodetector circuit that are arranged in each picture element of the sensor area of the third embodiment.

Circuit Configuration of the Display Panel:

FIG. 10 shows examples of a picture element circuit 41 arranged in each picture element a in the above-mentioned display panel (11) and a photodetector circuit 42' arranged in the sensor area 11*d*-3 of the display panel (11). It should be noted that, with reference to FIG. 10, components similar to those previously described with reference to FIGS. 9A and 9B are denoted by the same reference numerals, so that detail description thereof will be skipped.

The circuit of the display panel (11) in the third embodiment shown in FIG. 10 is substantially the same as that of the second embodiment, so that one photodetector circuit 42' having two photodetectors S, S' corresponding to one picture element a is arranged. One of these photodetectors, S' is covered with the light blocking film (35) shown in FIGS. 9A and 9B.

Method of Driving the Display Panel:

The following describes a method of driving the display panel 11 of the third embodiment with reference to FIGS. 9A, 9B and 10. The description of the driving of picture elements arranged in a display area 11*a* will be skipped because this driving is substantially the same as that of the first embodiment.

In the method of driving the display panel 11 shown in FIGS. 9A, 9B and 10, of the picture elements a arranged in the sensor area 11*d*-3, one of the two adjacently arranged picture elements a, a (W) is normally white displayed (W), while the other picture element a (B) is normally black displayed (B). It should be noted that the two adjacent picture elements a (W), a (B) are not limited to those picture elements which share a scan line 41*a*.

Consequently, as shown in FIG. 9A, with picture element a (W) that is normally white displayed (W), illuminating light h from a backlight 12 is left radiated from display surface A. With picture element a (B) that is normally black displayed (B), illuminating light h from the backlight 12 is absorbed by an analyzer 31 to be blocked. Then, in a state where picture element a (W) with illuminating light h radiated and picture element a (B) with illuminating light h blocked are separately set, these picture elements are put in a state where these picture elements are adjacently arranged.

The above-mentioned control of driving a liquid crystal layer in the display panel 11 is executed by a control block formed by the display drive circuit 13 and the application program execution block 16 shown in FIG. 1.

Figure 11:
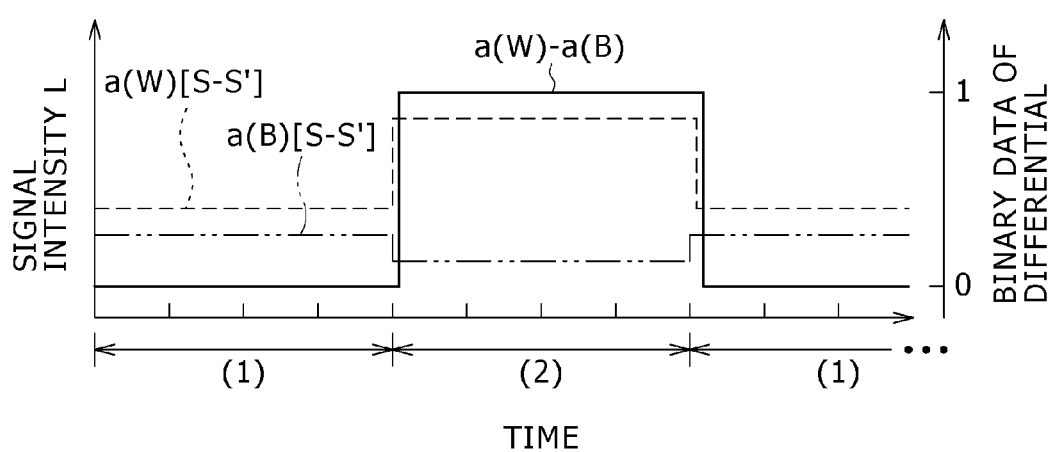
FIG. 11 is a graph indicative of signal intensity and binary data with a photodetector for describing a method of driving of the third embodiment.

Detection of an Object on the Display Panel:

The following describes the detection of an object P in the display panel 11 of the third embodiment with reference to FIGS. 9A, 9B and 11. It should be noted that FIG. 11 is a graph indicative of a relation between intensity L of a signal received and synthesized by photodetectors S, S' of picture element a (W) and picture element a (B) in the sensor area 11*d*-3 and binary data obtained from a difference between photodetectors S, S'.

First, as shown in FIGS. 9A and 11(1), a normal state in which an image is only displayed on display surface A of the display panel 11 is as follows.

To be specific, with picture element a (W) in the sensor area 11*d*-3, illuminating light h from the backlight 12 is left radiated from display surface A. Hence, like the second embodiment, photodetector S arranged in picture element a (W) receives "external light H" entered from the side of display surface A into the display panel 11 and, inside the display panel 11, "scattered illuminating light h." At the same time, photodetector S' having a light blocking film receives "external light H." Therefore, the photoreception data of the difference photoelectrically converted by photodetectors S, S' and synthesized by the photodetector circuit (42'; refer to FIG. 10) provides a value removed of "external light H" as a noise component.

On the other hand, with picture element a (B) in the sensor area 11*d*-3, illuminating light h from the backlight 12 is absorbed by the analyzer 31 and in the blocked state. Hence, photodetector S of picture element a (B) receives "external light H" entered from the side of display surface A into the display panel 11 and, inside the display panel 11, "scattered illuminating light h." However, with picture element a (B), illuminating light h is absorbed by the analyzer 31, so that photodetector S of picture element a (B) receives less amount of light because of a smaller amount of scattered light than that with picture element a (W). At the same time, picture element a (B) receives "external light H" entered in the display panel 11.

Consequently, the photodetection data photoelectrically converted by two photodetectors S, S' arranged in picture element a (B) and synthesized by the photodetector circuit (42'; refer to FIG. 10) provides a value removed of most noise components such as "external light H" entered as a noise component.

Further, in the third embodiment, the photodetection data synthesized by picture element a (W) and the photodetection data synthesized by picture element a (B) are outputted to a photodetection drive circuit for synthesis, thereby binarizing the synthesized photodetection data relative to a properly set standard threshold value. Consequently, precision determination can be made that object P does not exist in the proximity of picture element a (W) and picture element a (B) in the sensor area 11d-3.

Next, as shown in FIGS. 9B and 11(2), in an operation state where object P, such as a human finger or a pen tip, gets in the proximity of the operation display block 11c on display surface A of the display panel 11, object P also gets in the proximity of the sensor area 11d-3 arranged in the proximity of the operation display blocks 11c, followed by a state shown below.

To be specific, with picture element a (W) of the sensor area 11d-3, illuminating light h from the backlight 12 is radiated from display surface A to be reflected from object P and external light H from the side of display surface A is blocked by object P. Therefore, photodetector S of picture element a receives "illuminating light h reflected from object P" and, inside the display panel 11, "scattered illuminating light h." With photodetector S', illuminating light h from the backlight 12 is blocked by the light blocking film 35 and external light H from the side of display surface A is also blocked by object P.

Consequently, the photodetection data of the difference photoelectrically converted by two photodetectors S, S' arranged in picture element a (W) and synthesized by the photodetector circuit (42'; refer to FIG. 10) provides a value mainly due to "illuminating light h reflected from object P."

On the other hand, with picture element a (B) of the sensor area 11d-3, illuminating light h from the backlight 12 is absorbed by the analyzer 31 to be blocked and external light H from the side of display surface A is also blocked by object P. Hence, photodetector S of picture element a (B) receives "scattered illuminating light h" inside the display panel 11 and photodetector S' does not receive this light.

Consequently, the photodetection data of the difference photoelectrically converted by two photodetectors S, S' arranged in picture element a (B) and synthesized by the photodetector circuit (42'; refer to FIG. 10) provides a value only slightly due to "scattered illuminating light h" inside the display panel 11.

Further, in the third embodiment, the photodetection data synthesized in picture element a (W) and the photodetection data synthesized in picture element a (B) are outputted to the photodetection drive circuit for synthesis, thereby binarizing the synthesized photodetection data relative to a properly set standard threshold value. Consequently, precision determination can be made that object P exists in the proximity of picture element a (W) and picture element a (B) in the sensor area 11d-3.

The processing of binarizing the photodetection data of difference (or voltage difference) synthesized by the photodetector circuit (42'; refer to FIG. 10) is executed by the image processing block (15; refer to FIG. 1). Therefore, the photodetector circuit 42', the photodetector drive circuit (14), and the image processing block (15) form a detection block for executing image recognition in the proximity of the display surface on the basis of the difference of the photodetection data in each of photodetectors S arranged in two different states.

As described above, the configuration of the third embodiment also allows image recognition in the proximity of the display surface by a photodetection amount obtained by subtracting the noise caused by a change in external environment or an internal configuration of the apparatus, without making the backlight 12 flash. Consequently, like the first embodiment, the third embodiment allows the highly accurate detection of object P, while preventing the luminance reduction over all the display area 11a and the generation of flickers.

(4) The Fourth Embodiment

The following described the fourth embodiment by use of an example in which image detection on a display surface is executed by time division in which white display and black display are executed by one picture element.

Overall Configuration of a Display Apparatus:

An overall configuration of a display apparatus to which the fourth embodiment is applied is substantially the same as that described before with reference to the block diagram shown in FIG. 1 and the general top view shown in FIGS. 2A and 2B with respect to the first embodiment. However, the fourth embodiment differs from the first embodiment in a configuration of a photodetector circuit in a sensor area 11d-4 of a display panel 11 and processing operations to be executed in circuits and components. The following describes details of elements that are different from those of the first embodiment.

Figure 12A:
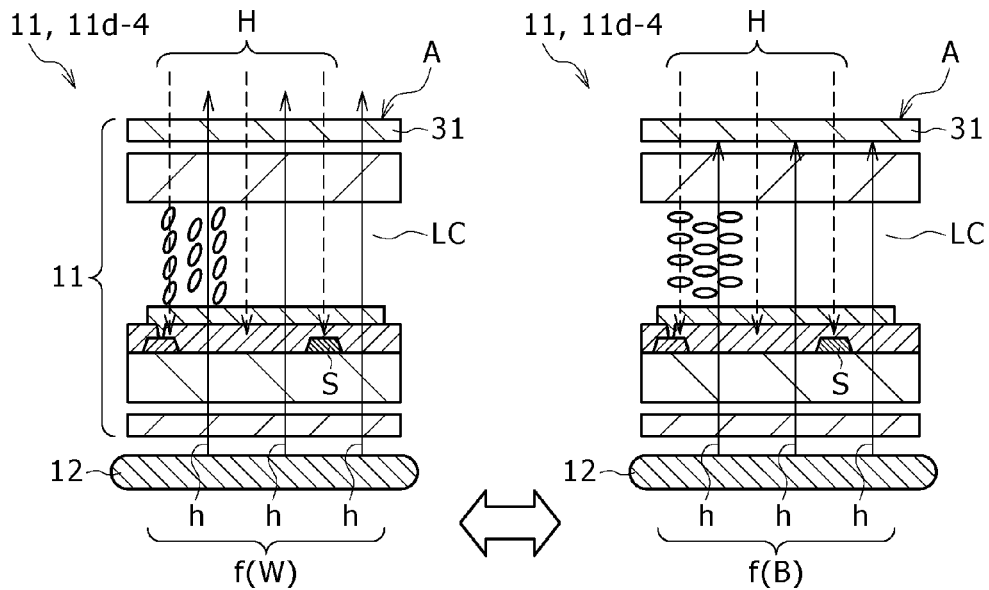
FIGS. 12A and 12B are cross sectional configuration diagrams of a sensor area of a fourth embodiment.
Figure 12B:
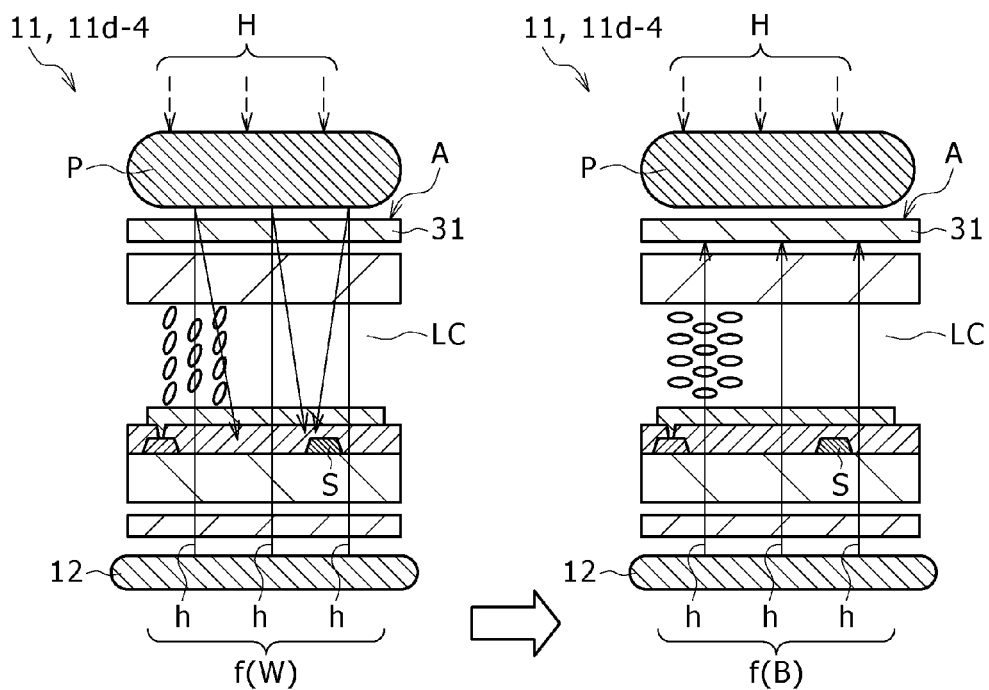

Cross Sectional Configuration of the Display Panel:

FIGS. 12A and 12B show cross sections for two picture elements typically indicative of a cross sectional configuration of a sensor area sensor area 11d-4 as a cross sectional configuration of the display panel 11 of the fourth embodiment. The cross sectional configuration of the display panel 11 of the fourth embodiment shown in these figures is substantially the same as that of the display panel of the first embodiment, in which photodetector S is arranged in each picture element a in the sensor area 11d. The other portions of cross sectional configuration are substantially the same as those of the first embodiment, so that detail description thereof will be skipped.

Figure 13:
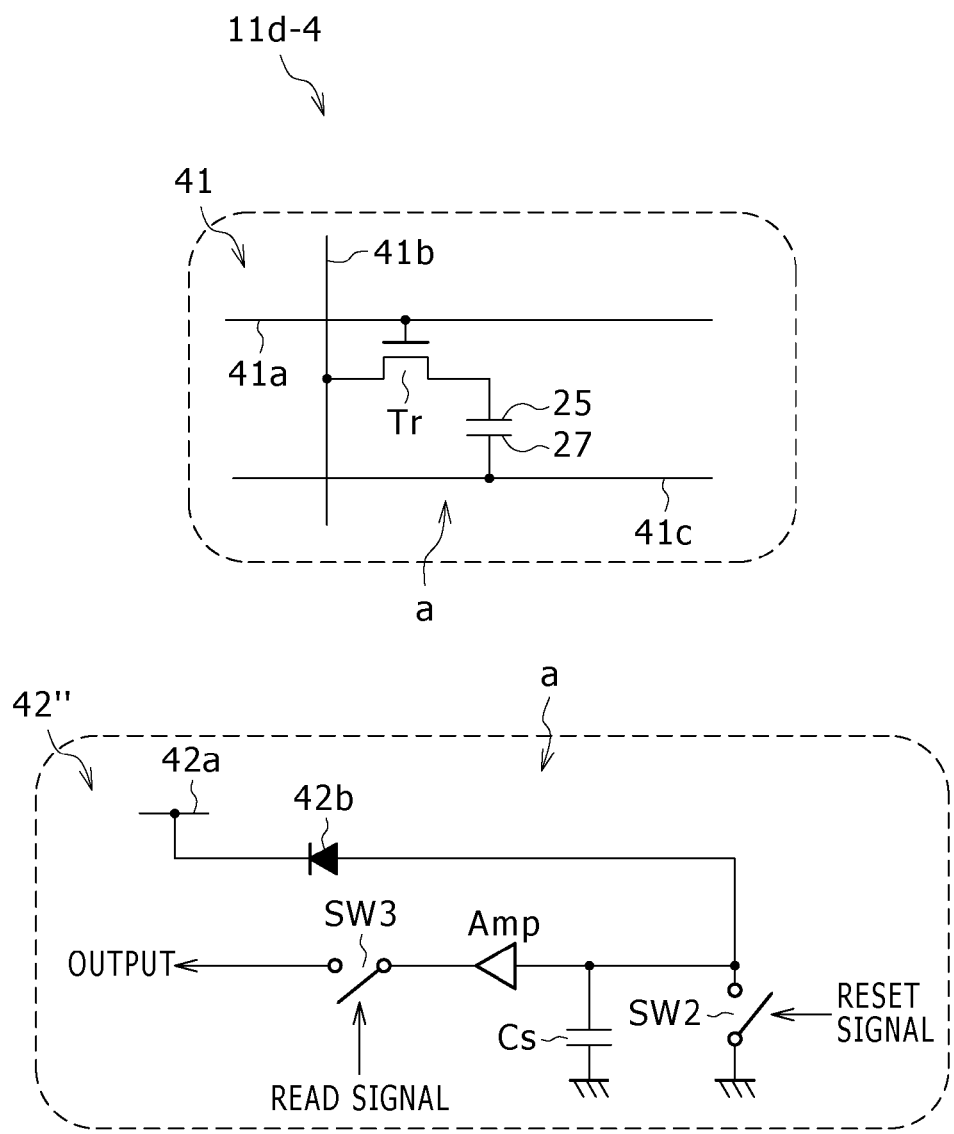
FIG. 13 shows a picture element circuit and a photodetector circuit that are arranged in each picture element of the sensor area of the fourth embodiment.

Circuit Configuration of the Display Panel:

FIG. 13 shows examples of a picture element circuit 41 arranged in each picture element a inside the above-mentioned display panel (11) and a photodetector circuit 42" arranged inside the sensor area 11d-4 of the display panel (11). It should be noted that, with reference to FIG. 13, components similar to those previously described with reference to FIGS. 12A and 12B are denoted by the same reference numerals.

The fourth embodiments differs from the other embodiments in that, for the circuit of the display panel (11) in the fourth embodiment, the photodetector circuit 42" in which one photodetector S is arranged for one picture element a is arranged.

Method of Driving the Display Panel:

The following describes a method of driving the above-mentioned display panel 11 of the fourth embodiment with reference to FIGS. 12A, 12B and 13. It should be noted that the driving of picture elements arranged in the display area 11a is substantially the same as that of the first embodiment, so that the description thereof will be skipped.

In the method of driving the display panel 11 in the fourth embodiment shown in these figures, white display (W) and black display (B) are alternated in each picture element a arranged in the sensor area 11d-4. Alternation between white display period f(W) and black display period f(B) is executed for each display frame period for example.

Consequently, as shown in FIG. 12A, in white display period f(W) in which picture element a is white display (W), illuminating light h from a backlight 12 is radiated from display surface A. In black display period f(B) in which picture element a is black display (B), illuminating light h from the backlight 12 is absorbed by the analyzer 31 to be blocked. Then, the state in which illuminating light h is radiated and the state in which illuminating light h is blocked are continuously alternately executed inside one picture element a by the driving of the liquid crystal layer. In addition, in adjacent picture element a, white display period f(W) and black display period f(B) may be inverted to provide the recognition of the entire sensor area 11d as a normally stable halftone.

It should be noted that the driving control of the display panel 11 such that the illuminating light radiated state and the illuminating light blocked state are alternately executed for each picture element a by driving the liquid crystal layer as described above is executed by a control block formed by a display drive circuit 13 and an application program execution block 16.

Figure 14:
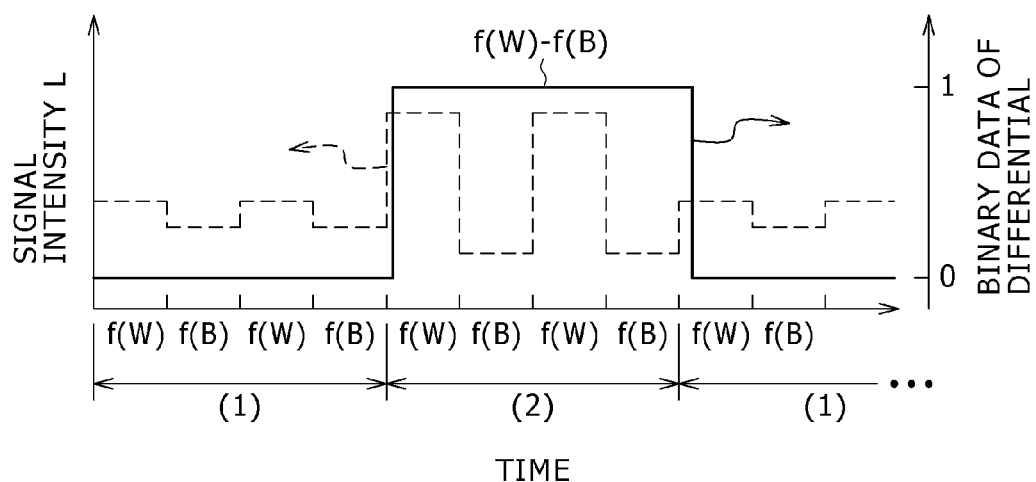
FIG. 14 is a graph indicative of signal intensity and binary data with a photodetector for describing a method of driving of the fourth embodiment.

Detection of an Object on the Display Panel:

The following describes the detection of object P in the display panel 11 of the fourth embodiment having the above-mentioned configuration with reference to FIGS. 12A, 12B and 14. It should be noted that FIG. 14 is a graph indicative of a relation between intensity L of a signal received by photodetector S arranged in picture element a inside the sensor area 11d-4 and binary data obtained from a difference between f(W) and f(B).

First, as shown in FIGS. 12A and 14(1), a normal state in which an image is only displayed on display surface A of the display panel 11 is as follows.

To be specific, in white display period f(W) in picture element a, illuminating light h from the backlight 12 is left radiated from display surface A. Hence, photodetector S of white display period f(W) receives "external light H" entered from the side of display surface A into display panel 11 and, inside the display panel 11, "scattered illuminating light h."

On the other hand, in black display period f(B) in picture element a, illuminating light h from the backlight 12 is absorbed by the analyzer 31 to be blocked. Hence, photodetector S of black display period f(B) receives "external light H" entered in the display panel 11 and, inside the display panel 11, "scattered illuminating light h." However, in black display period f(B), illuminating light h is absorbed by the analyzer 31, so that photodetector S of black display period f(B) receives a less amount of light because of a smaller amount of scattered light than that of photodetector S of white display period f(W).

Then, of the photodetection data obtained repetitively in each of display periods f(W) and f(B) in photodetector S arranged in each picture element a as described above, a difference between the photodetection data obtained in two consecutive frame periods f(W) and f(B) is computed.

The photodetection data of the difference provides a value removed of most noise components, such as "external light H" and "scattered illuminating light h." Therefore, binarizing the photodetection data removed of noise components relative to a properly set standard threshold value allows precision determination that object P does not exist in the proximity of picture element a of the sensor area 11d-4.

Next, as shown in FIGS. 12B and 14(2), in an operation state where object P, such as a human finger or a pen tip, gets in the proximity of the operation display block 11c on display surface A of the display panel 11, object P also gets in the proximity of the sensor area 11d-4 arranged in the proximity of the operation display blocks 11c, followed by a state shown below.

To be specific, in white display period f(W) in picture element a, illuminating light h from the backlight 12 is radiated from display surface A to be reflected from object P and external light H from the side of display surface A is blocked by object P. Hence, photodetector S in white display period f(W) receives "illuminating light h reflected from object P" and, inside the display panel 11, "scattered illuminating light h."

On the other hand, in black display period f(B) in picture element a, illuminating light h from the backlight 12 is absorbed by the analyzer 31 to be blocked and external light H from the side of display surface A is also blocked by object P. Hence, photodetector S in black display period f(B) receives only "scattered illuminating light h" inside the display panel 11.

Of the photodetection data repetitively obtained in each of periods f(W) and f(B) in photodetector S arranged in each picture element a, a difference between the photodetection data obtained in two consecutive frame periods f(W) and f(B) is computed.

The photodetection data of the difference provides a value mainly due to "illuminating light h reflected from object P" removed of most noise components. Therefore, binarizing the photodetection data removed of noise components relative to a properly set standard threshold value as described above allows precision determination that object P exists in the proximity of picture element a of the sensor area 11d-4.

The processing of differentiating the photodetection data obtained in each picture element a of the sensor area 11d-4 before and after consecutive frame periods f(W) and f(B) and the processing of binarizing the photodetection data removed of noise components relative to a standard threshold value are executed in the image processing block (15; refer to FIG. 1). Hence, the photodetector circuit 42", the photodetection drive circuit (14), and the image processing block (15) form a detection block for executing image recognition in the proximity of display surface on the basis of the difference between the photodetection data in each photodetector S arranged in two different states.

As described above, the configuration of the fourth embodiment also allows image recognition in the proximity of display surface by a photodetection amount obtained by subtracting the noise caused by a change in external environment or an internal configuration of the apparatus, without making the backlight 12 flash. Consequently, the fourth embodiment allows the highly accurate detection of object P, while preventing the luminance reduction over all the display area 11a and the generation of flickers.

Application Examples

The above-mentioned display apparatus associated with the embodiments is applicable to a variety of electronic devices as shown in FIG. 15 through FIG. 19, for example. For example, the above-mentioned display apparatus is applicable to the display apparatuses of electronic devices of digital cameras, note-type personal computers, portable terminal devices such as mobile phones, video cameras, and other electronic devices that display video signals entered or generated therein. The following describes examples of electronic devices to which the embodiments are applied.

Figure 15:
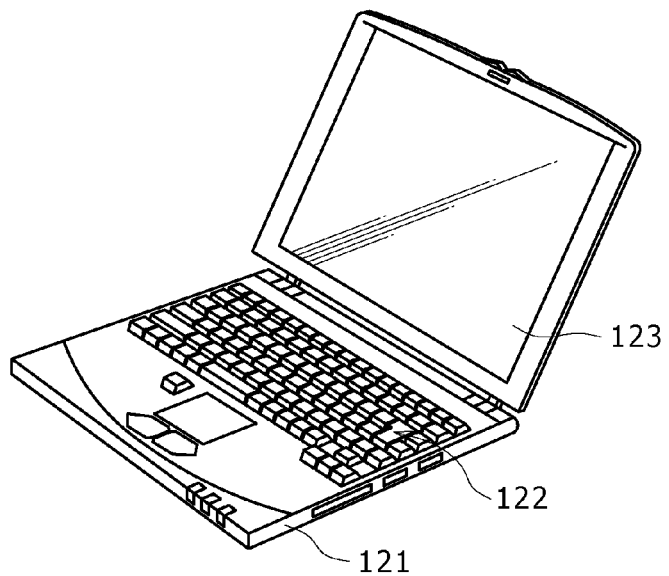
FIG. 15 is a perspective view of a note-type personal computer to which the embodiments are applied.

FIG. 15 is a perspective view of a note-type personal computer to which the embodiments are applied. The note-type personal computer to which the embodiments are applied has a main body 121, a keyboard 122 through which texts and so on are entered, a display block 123 for displaying images, and so on and is fabricated by use of the display apparatus associated with the embodiments as the display block 123 thereof.

Figure 16:
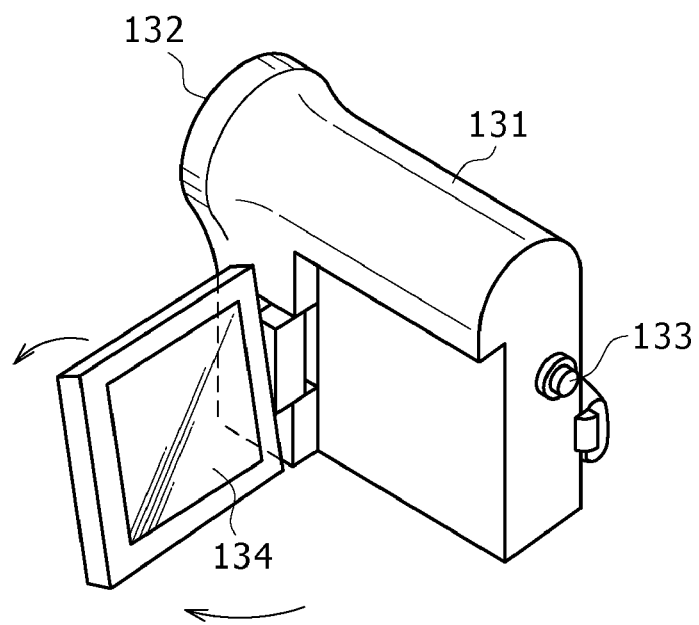
FIG. 16 is a perspective view of a digital video camera to which embodiments of present invention are applied.

FIG. 16 is a perspective view of a video camera to which the embodiments are applied. The video camera to which the embodiments are applied has a main body block 131, a lens 132 arranged on the front side for taking a subject, a start/stop switch 133 for recording video or stopping recording, a display block 134, and so on and is fabricated by use of the display apparatus associated with the embodiments as the display block 134 thereof.

Figure 17:
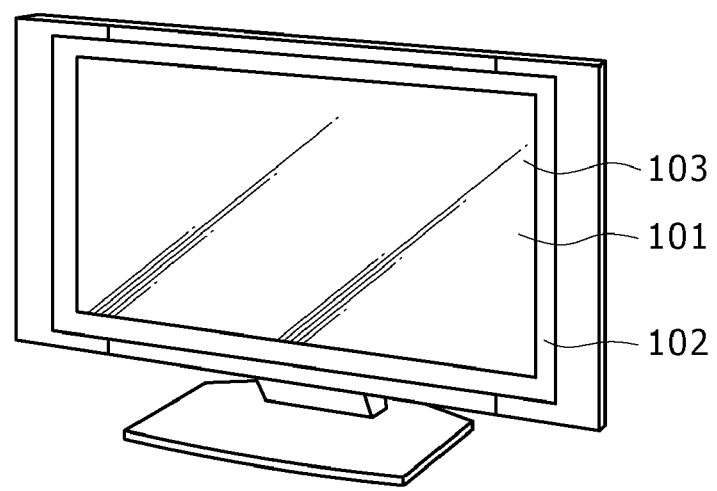
FIG. 17 is a perspective view of a television to which the embodiments are applied.

FIG. 17 is a perspective view of a television to which the embodiments is applied. The television associated with the embodiments has a video display screen block 101 composed of a front panel 102, a filter glass 103 and so on and is fabricated by use of the display apparatus associated with the embodiments as the video display screen block 101 thereof.

Figure 18A:
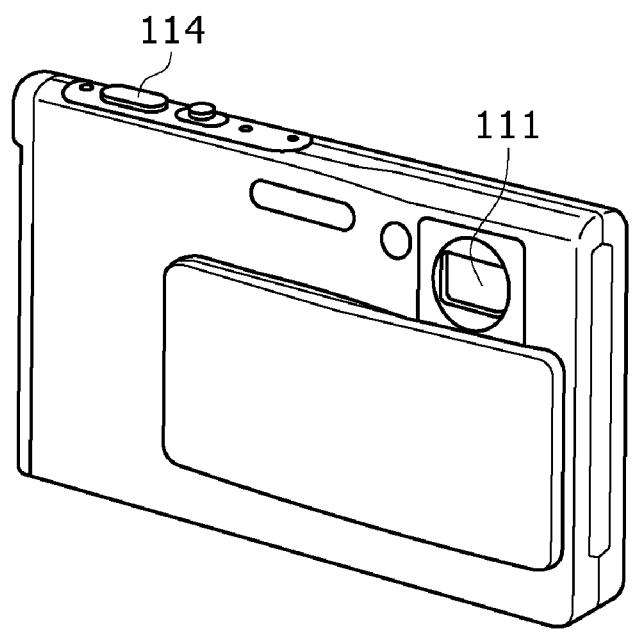
FIGS. 18A and 18B are perspective views of a digital camera, FIG. 18A indicative of a front view and FIG. 18B indicative of a rear view.
Figure 18B:
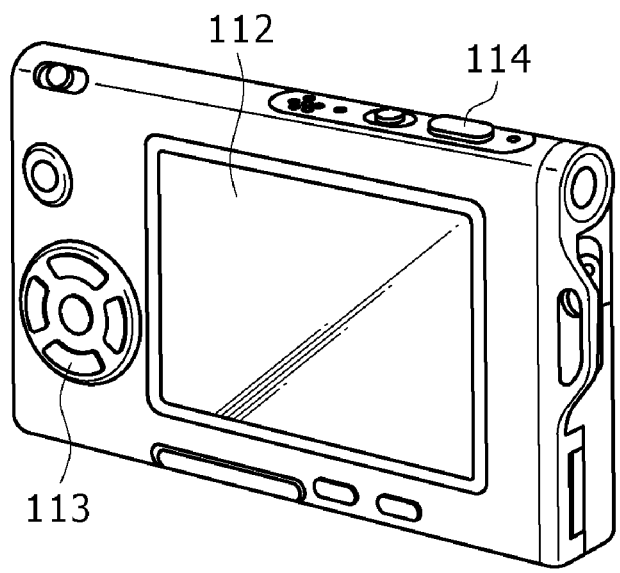

FIGS. 18A and 18B show a digital camera to which the embodiments are applied, FIG. 18A being a perspective view in which the digital camera is seen from the front thereof while FIG. 18B being a perspective view in which the digital camera is seen from the rear thereof. The digital camera associated with the embodiments has a light emitting block 111 for flash, a display block 112, a menu switch 113, a shutter button 114, and so on and is fabricated by use of the display apparatus associated with the embodiments as the display block 112 thereof.

FIGS. 19A to 19G show a portable terminal apparatus, a mobile phone for example, to which the embodiments are applied, FIG. 19A being a front view in which the mobile phone is unfolded, FIG. 19B being a side view, FIG. 19C being a front view in which the mobile phone is folded, FIG. 19D being a left side view, FIG. 19E being a right side view, FIG. 19F being a top view, and FIG. 19G being a bottom view. The mobile phone to which the embodiments are applied has an upper case 141, a lower case 142, a connection block (a hinge in this example) 143, a display monitor 144, a sub display monitor 145, a picture light 146, a camera 147, and so on. This mobile phone is fabricated by use of the display apparatus associated with the embodiments as the display monitor 144 and the sub display monitor 145.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A display apparatus comprising:
    a display panel having a plurality of picture elements configured to execute lay by driving a liquid crystal layer;
    a backlight configured to illuminate a display surface of said display panel from a backside;
    a photodetector arranged on said plurality of picture elements and configured to receive a light entered from the side of said display surface of said display panel;
    a detection block configured to execute image recognition in the proximity of said display surface from a difference between a photodetection amount in said photodetector in a state where an illuminating light from said backlight is radiated from said display surface and a photodetection amount in said photodetector in a state where said illuminating light is blocked before said display surface; and
    a control block configured to execute a state where said illuminating light is radiated and a state where said illuminating light is blocked by driving said liquid crystal layer.

2. The display apparatus according to claim 1, wherein, of said plurality of picture elements, those picture elements on each of which said photodetector is arranged are arranged on a rim of a display area of said display panel.

3. The display apparatus according to claim 1, wherein of the picture elements on each of which said photodetector is arranged, an picture element in which said illuminating light is radiated and a picture element in which said illuminating tight is blocked are separately set.

4. The display apparatus according to claim 3, wherein said picture element in which said illuminating light is radiated and said picture element in which said illuminating light is blocked are arranged in proximity.

5. The display apparatus according to claim 1, further comprising
    a control block configured to continuously execute said state where said illuminating light is radiated and said state where said illuminating light is blocked in one of said plurality of picture elements by driving said liquid crystal layer.

6. The display apparatus according to claim 1, wherein two photodetectors are arranged in each of said plurality of picture elements, one of said two photodetectors being covered with a light blocking film on the side of said backlight.

7. The display apparatus according to claim 1, wherein of said plurality of picture elements, those picture elements on each of which said photodetector is arranged are arranged in a part of said display panel.

8. A display method comprising:
    illuminating a display surface of a display panel having a plurality of picture elements for executing display by driving a liquid crystal layer and a photodetector arranged on said plurality of picture elements, from the side of a rear surface of the display panel by a backlight;
    executing image recognition in the proximity of said display surface from a difference between a photodetection amount received by said photodetector in a state where an illuminating light from said backlight is radiated from said display surface and a photodetection amount received by said photodetector in a state where said illuminating light from said backlight is blocked before said display surface; and
    executing a state where said illuminating light is radiated and a state where said illuminating light is blocked by driving said liquid crystal layer.

\* \* \* \* \*